No. 824,453. PATENTED JUNE 26, 1906.
E. L. THOMPSON.
AUTOMATIC SPRINKLER.
APPLICATION FILED SEPT. 2, 1902. RENEWED DEC. 1, 1905.

WITNESSES:
Jessie B. Kay.
Alexander Mitchell

INVENTOR
Everett L. Thompson
BY Duncan & Duncan
ATTORNEYS

UNITED STATES PATENT OFFICE.

EVERETT L. THOMPSON, OF BROOKLYN, NEW YORK.

AUTOMATIC SPRINKLER.

No. 824,453.

Specification of Letters Patent.

Patented June 26, 1906.

Application filed September 2, 1902. Renewed December 1, 1905. Serial No. 289,783.

*To all whom it may concern:*

Be it known that I, EVERETT L. THOMPSON, of New York city, borough of Brooklyn, county of Kings, and State of New York, have invented certain new and useful Improvements in Automatic Sprinklers, of which the following is a specification, taken in connection with the accompanying drawings, which form a part of the same.

This invention relates to automatic sprinklers for connection with distributing-pipes in buildings for the purpose of protecting such buildings from fire.

Figure 1:
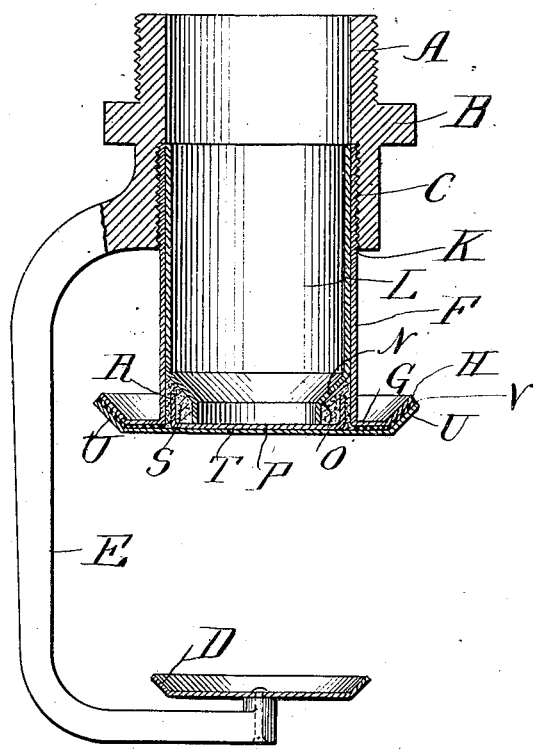
Figure 2:
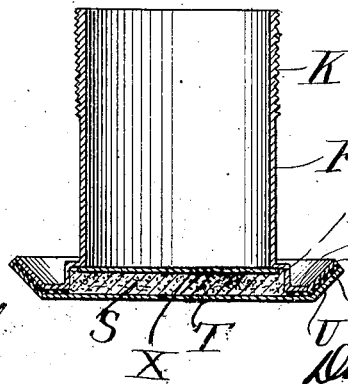

In the accompanying drawings, in which the same reference-letter refers to similar parts in both figures, Figure 1 is a sectional view of one form of sprinkler embodying this invention. Fig. 2 is a sectional view showing a modified construction.

The open nozzle F of this sprinkler, preferably constructed of brass or other metal, (shown in Fig. 1,) is preferably mounted in the head A, the two parts being joined by the threads K on the nozzle, which engage the corresponding threads C on the head. The head A is shown as threaded at its upper portion for ready connection with the distributing-pipe lines, the nut B being provided to turn this head. The cup-shaped distributer D, which is common in this art, is supported in line with and below the nozzle by the arm E, secured to the head, so that by this means the distributer is rigidly held in position to deflect the water issuing from the open nozzle. The nozzle F may, if desired, be provided with the liner L, which is shown forced within the nozzle so as to be rigidly supported in position. This liner is provided with the internal shoulder N, the lower end of the liner in this manner forming the pocket O, which in this instance is annular. The lower end of the nozzle is provided with a flange, comprising the straight part G and the flared nozzle-flange H.

The pocket O is filled with any suitable material, preferably such as paraffin-wax or other wax or even a more readily-fusible wax or heavy oil, so as to form a fusible releasable impervious seal. The diaphragm P, which may, if desired, have the edge flange R, is put in position, as indicated in Fig. 1, and is held firmly in contact with the lower end of the liner, so as to retain the seal in position at this point. The cap T, formed of any suitable metal, is provided with the flared edge flange U, which engages the corresponding flange at the bottom of the nozzle. These flanges are secured together by a suitable fusible solder, which, as is well known in this art, releases the parts on an excessive rise of temperature.

In Fig. 2 there is shown a form of nozzle which is also adapted for ready connection with a head, such as is shown in Fig. 1, this nozzle F, formed of suitable metal, being shown as provided with screw-threads K at its upper end. The lower end of the nozzle is in this instance preferably provided with an offset W and with the flanges G and H at its lower end, these flanges being engaged by corresponding flanges on the cap T, which is secured to the nozzle by the fusible solder V, so as to form an automatic release for the same. A releasable impervious seal S preferably formed of paraffin or other wax or heavy oil, is located within the nozzle adjacent the fusible joint, so as to prevent the access of water thereto. If desired, the diaphragm X may be employed to positively maintain this seal in position, this diaphragm, preferably of metal, engaging the offset W, as indicated, so as to form a closed pocket within which the seal is located.

It will of course be apparent that the impervious seal prevents the access of the water within the nozzle to the fusible joint, which maintains the cap in position. Furthermore, if the seal is located within an inclosed pocket, as indicated, it is maintained in position no matter how the sprinkler may be operated, whether in a pendent position, as indicated in the drawings, or in an upright position.

In the event of a rise of temperature the seal softens and in some cases melts, but may be positively maintained in this event adjacent the fusible joint, so that the water within the sprinkler is kept away from such joint until the cap is released from the nozzle, so that the operation of the sprinkler is reliable under all circumstances and not disturbed by the presence of water or other operating fluid adjacent the fusible joint or thermal-releasing means. As soon as the fusible joint is released the cap and diaphragm are at once forced away from the nozzle, leaving an open nozzle through which the water issues, and it will be noted, furthermore, that the releasable impervious seal is so constructed that no substantial resistance is offered thereby to the release of the cap in the operation of the sprinkler. With this form of fusible joint also there is substantially no opportunity for external corrosion of the parts near the fusible joint, so as to render the emergency operation of the sprinkler unreliable. In all cases, however, it is desirable that the seal be so located with reference to the thermally-releasable cap and the distributing-pipe with which the nozzle is connected that the seal, which is preferably of fusible wax, prevents the presence of the operating fluid adjacent the juncture between the cap and the nozzle. It is of course understood that it is not necessary to construct this sprinkler exactly as has been described.

Variations may be made in the proportions of parts, and, furthermore, parts of this device may be omitted and other parts substituted, if desired, without departing from the spirit of this invention. I do not, therefore, desire to be limited to the disclosure which has been made in this case; but

What I claim as new and what I desire to secure by Letters Patent is set forth in the appended claims.

1. In an automatic sprinkler, a head for connection with a distributing-pipe, a distributer supported from said head, an open nozzle removably secured in said head in line with said distributer, said nozzle being provided with the flaring flange adjacent its open end, said nozzle comprising a liner secured within the same and provided with an internal shoulder to form an anunlar pocket, a cap provided with a flared flange releasably secured to said nozzle by a fusible joint, an impervious seal within said pocket to prevent the access of water to said fusible joint and a diaphragm to maintain said seal in position.

2. In an automatic sprinkler, an open nozzle provided with a flared flange adjacent its open end, a cap provided with a flared flange secured by a fusible joint to said nozzle, said nozzle being constructed to form a pocket adjacent said fusible joint, an impervious seal in said pocket and a diaphragm to maintain said seal in position.

3. In an automatic sprinkler, a nozzle, a cap releasably secured to said nozzle by a fusible joint and a releasable impervious seal within said nozzle, said nozzle providing an open unobstructed passage of full area on the release of said cap.

4. In an automatic sprinkler, an open nozzle, a cap releasably secured upon said nozzle by a fusible joint, a releasable impervious seal within said nozzle adjacent said fusible joint and means to maintain said seal in position.

5. In an automatic sprinkler, an open nozzle, a cap secured upon said nozzle by a fusible joint and a releasable impervious seal within said nozzle adjacent said fusible joint.

6. In an automatic sprinkler, a nozzle, a cap secured to said nozzle by thermally-operated releasing means and a releasable impervious seal within said nozzle, said nozzle providing an open unobstructed passage of full area on the release of said cap.

7. In an automatic sprinkler, an open nozzle provided with a flange adjacent the open end of the same, a cap releasably secured upon said nozzle by the fusible joint, a releasable impervious seal within said nozzle adjacent said fusible joint and means to maintain said seal in position, said means being releasable upon the release of said fusible joint to provide an open unobstructed passage through said nozzle.

8. In an automatic sprinkler, an open nozzle, a cap releasably secured upon said nozzle by the fusible joint, a releasable impervious seal within said nozzle adjacent said fusible joint and means to maintain said seal in position, said means being releasable to provide an open unobstructed passage through said nozzle on the release of said cap.

9. In an automatic sprinkler, an open nozzle, a cap secured upon said nozzle by a fusible joint and a fusible impervious seal within said nozzle adjacent said fusible joint to prevent the contact of water with said fusible joint and to provide an open unobstructed passage through said nozzle on the release of said fusible joint.

10. In an automatic sprinkler, an open nozzle, a cap secured upon said nozzle by a fusible joint, and a releasable wax seal within said nozzle adjacent said fusible joint to prevent the access of fluid thereto.

11. In an automatic sprinkler, a nozzle, a cap releasably secured upon said nozzle, and a fusible wax seal to prevent the presence of fluid adjacent said cap.

12. In an automatic sprinkler, a nozzle, a cap releasably secured upon said nozzle, a releasable impervious seal to prevent the presence of fluid adjacent said cap and means to maintain said seal in position, said means being releasable upon the release of said cap.

13. In an automatic sprinkler, a nozzle, a cap releasably secured upon said nozzle by a fusible joint and a fusible wax seal to prevent the presence of fluid adjacent said fusible joint, said seal being releasable upon the release of said cap.

14. In an automatic sprinkler, a nozzle, a cap secured upon said nozzle by a fusible joint and a releasable fusible impervious seal to prevent the presence of fluid adjacent said fusible joint.

15. In an automatic sprinkler, a nozzle, a thermally-releasable cap secured thereto and a fusible seal to prevent the presence of fluid adjacent the juncture between said cap and said nozzle.

EVERETT L. THOMPSON.

Witnesses:
JESSIE B. KAY,
HARRY L. DUNCAN.